Feb. 15, 1949.   J. L. RICHMOND   2,461,568
PARAFFIN ISOMERIZATION PROCESS
Filed Nov. 9, 1943
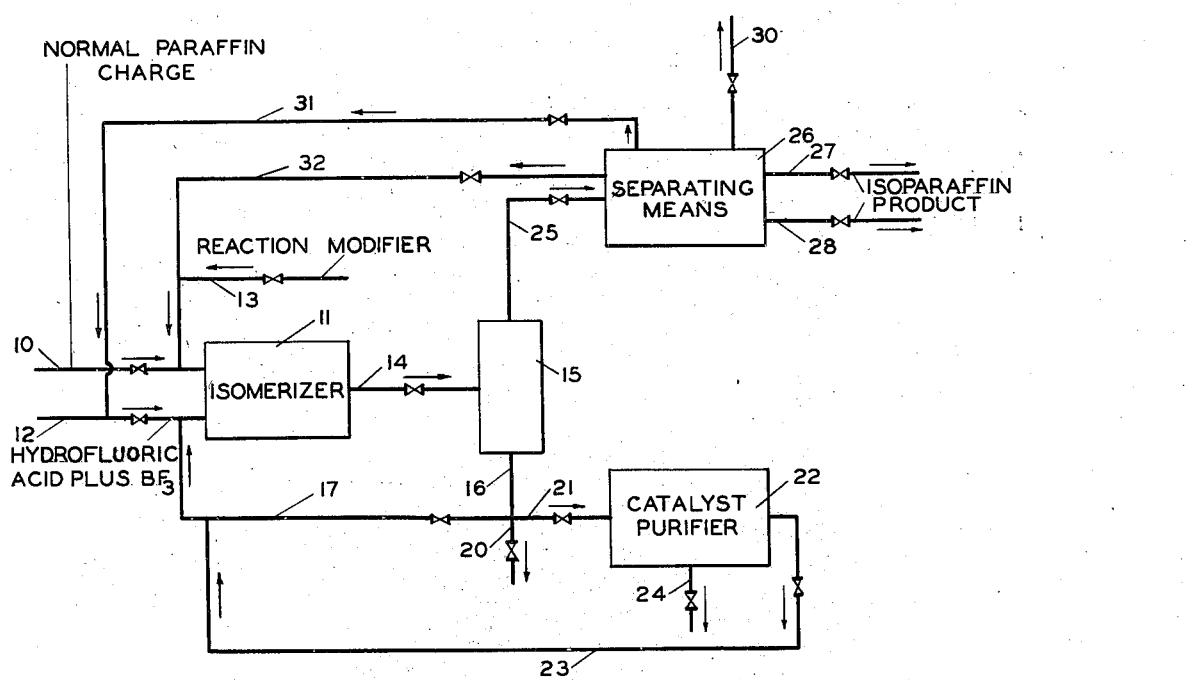
INVENTOR
JOHN L. RICHMOND
BY
ATTORNEYS Patented Feb. 15, 1949

2,461,568

UNITED STATES PATENT OFFICE 2,461,568

PARAFFIN ISOMERIZATION PROCESS

John L. Richmond, Bartlesville, Okla., assignor to Phillips Petroleum Company, a corporation of Delaware Application November 9, 1943, Serial No. 509,611

11 Claims. (Cl. 260—683.5)

This invention relates to the isomerization of paraffin hydrocarbons. In a specific embodiment it relates to the isomerization of low-boiling paraffin hydrocarbons in the presence of liquid hydrofluoric acid as the isomerization catalyst, and in the presence of a low-boiling cycloparaffin as a reaction modifier. A still more specific embodiment relates to the isomerization of a paraffin hydrocarbon having at least 5 carbon atoms per molecule and boiling below about 450° F., in the presence of a catalyst comprising hydrofluoric acid and a minor proportion of boron trifluoride and in the presence, as a reaction modifier, of a low-boiling cycloparaffin having at least 5 carbon atoms in the ring.

The conversion of paraffin hydrocarbons, in the presence of hydrofluoric acid as the conversion catalyst, appears to take place by two different reactions. The first of these reactions is straight-forward isomerization as when normal pentane is converted to isopentane. The second of these reactions involves the production of paraffin hydrocarbons having both higher and lower molecular weights than the paraffin hydrocarbon converted, as when two molecules of a pentane are converted to one molecule of a butane and one molecule of a hexane. Generally the paraffins so produced have a branched-chain structure. It appears that these reactions occur concomitantly so that under ordinary reaction conditions and in the absence of reaction modifiers it is not possible to convert paraffin hydrocarbons without obtaining products resulting from both of these reactions.

I have now found that when paraffin hydrocarbons are converted to other paraffin hydrocarbons in the presence of concentrated hydrofluoric acid as the conversion catalyst the second of the above reactions may be substantially and often completely suppressed by incorporating in the reaction mixture a low-boiling cycloparaffin. Thus I can convert a normal paraffin such as normal pentane to the isomeric form, in this case 2-methylbutane, with negligible production of hydrocarbons such as butanes and hexanes by incorporating in the reaction mixture a cycloparaffin such as a low-boiling cyclopentane or cyclohexane. As catalysts I prefer to use one in which the essential catalytic material is hydrofluoric acid, and generally I prefer to associate with the hydrofluoric acid a minor amount of boron trifluoride, preferably not more than 10 per cent by weight of the catalyst mixture, and generally not more than about 1 to 5 per cent by weight is sufficient.

An object of this invention is to isomerize low-boiling paraffin hydrocarbons.

Another object of this invention is to isomerize a low-boiling paraffin hydrocarbon in the presence of concentrated hydrofluoric acid as the essential isomerization catalyst without converting said paraffin hydrocarbon to paraffins having higher or lower molecular weights.

A further object of this invention is to provide an economical process for converting normal butane, normal pentane, normal hexane, or normal heptane to corresponding isomeric paraffin hydrocarbons.

A further object of this invention is to convert normal hexane to neohexane.

A still further object of this invention is to produce diisopropyl from a less highly branched hexane.

Other objects and advantages of this invention will become apparent to one skilled in the art from the accompanying disclosure and discussion.

The catalyst employed in the practice of my invention is essentially hydrogen fluoride and is preferably employed in the liquid phase. A more active modification of the catalyst comprises liquid hydrogen fluoride associated with a minor amount of boron trifluoride which need not exceed about 10 per cent by weight of the total catalyst, and is preferably between about 0.1 and about 5 to 7 per cent by weight of the total catalyst. No nickel or other catalytic agent is required and in many cases the reactions may be carried out at temperatures near or only slightly above atmospheric, preferably at a temperature between about 50 and about 300° F. Although the catalyst can be recovered in substantially unchanged condition at the end of the reaction and can be reused many times, there is generally associated with the used catalyst a small amount of organic matter. It is well to see to it that this organic matter does not accumulate to too great an extent, and when the catalyst is reused it is well to subject at least a portion of it to a purification treatment to remove such organic matter. The amount of organic matter formed can often be reduced by incorporating with the catalyst a minor amount of water, and generally this amount need not exceed about 1 per cent of the catalyst mixture. When boron trifluoride is used as a component of the catalyst it should exceed the molecular equivalent of the water present since it appears that water disappears as such and enters into a combination with the boron trifluoride. Even in the absence of boron trifluoride the water disappears as such and apparently enters into a combination with the hydrogen fluoride. Such a use of water in a hydrogen fluoride-boron trifluoride catalysts is more thoroughly disclosed and discussed in Frey application Serial No. 511,444, filed November 23, 1943. Although the reaction will take place in the vapor phase it is prefered to have both the catalyst and the reactants present in liquid phase and the pressure on the system should be such that it exceeds the total vapor pressure of the reaction mixture. The amount of catalyst present should be such that when operating in the liquid phase separate catalyst and hydrocarbon phases exist, and a ratio of catalyst to hydrocarbon phases between about 0.1:1 and about 3:1 should be used. The catalyst and the hydrocarbon reactants should be brought into and maintained in intimate contact during the reaction period. Preferably such contact is effected by a mechanical mixing which results in substantial emulsification of the two phases. Satisfactorily efficient mixing may be secured by means of a mixing pump, by passing the mixture at a high velocity through a series of baffles, by injecting the hydrocarbon charge at a high velocity through a jet into a body of the reaction mixture, by recirculation of the reaction mixture in a closed cycle, or the like as can be readily effected by one skilled in the art. When the reaction is carried out in a long reaction zone of restricted cross-sectional area as in a tube coil, it may be found desirable to add one or more components of the catalyst at various points along the length of the reaction zone. The reaction time should be such as to effect a substantial amount of isomerization of the paraffin charge; the reaction time will vary somewhat inversely with the temperature and more or less directly with the concentration of the cycloparaffin employed as a reaction modifier. Thus with higher concentrations of cycloparaffin longer reaction times may be employed, other conditions being constant, without effecting unduly large amounts of reactions other than the desired isomerization reaction. Generally a reaction time less than about two hours will be satisfactory, preferably one between about 10 and about 30 minutes. The amount of cycloparaffin employed need not exceed about 25 per cent by weight of the total hydrocarbon charge, and I have found that at least about 5 per cent by weight should be employed in order to obtain substantial benefits from the invention. It has been found that paraffin hydrocarbons which are less reactive under the reaction conditions used than the paraffin hydrocarbon being subjected to isomerization have a somewhat similar effect in suppressing reactions other than isomerization. Thus propane can be employed to aid in the isomerization of normal pentane. However, substantially larger amounts of such less reactive paraffin hydrocarbons are necessary than for the cycloparaffins, such as up to about 50 per cent by weight, of the total hydrocarbon charge.

An understanding of various aspects of my invention may be aided by referring to the accompanying drawing and the discussion thereof. This drawing is a schematic flow diagram showing one arrangement of apparatus which may be used in the practice of one embodiment of the invention. It will be readily appreciated that this drawing is in the nature of a flow diagram and that numerous individual pieces of equipment including pumps, compressors, heat exchangers, fractionating columns, etc. will be needed in any specific application of my invention.

Referring now to the drawing, a paraffin hydrocarbon such as normal pentane is introduced through pipe 10 to isomerizer 11. A suitable catalyst such as liquid concentrated hydrofluoric acid containing about 5 per cent by weight of dissolved boron trifluoride is passed to the isomerizer through pipe 12 in an amount substantially equivalent to the liquid volume of the paraffin charged through pipe 10. A cycloparaffin such as cyclohexane is passed to isomerizer 11 as a reaction modifier through pipe 13 in an amount such as between about 15 and 20 per cent of the total hydrocarbon material charged through pipes 10 and 13. In isomerizer 11 the reaction mixture is maintained in intimate admixture at a reaction temperature such as about 150° F. for a suitable reaction time such as about 20 minutes. A portion of the reaction mixture is then passed from isomerizer 11 through pipe 14 to separator 15 wherein a separation takes place between a lighter hydrocarbon phase and a heavier liquid hydrofluoric acid phase. If desired the temperature of the separation in separating means 15 may be substantially the same as, or appreciably lower than, the reaction temperature, the latter being effected by cooling means not shown.

From separator 15 the catalyst phase is removed through pipe 16 and at least a substantial portion thereof may be returned through pipe 17 to pipe 12 and into isomerizer 11. In order to maintain any impurities at a desired low value, a portion of this catalyst may be withdrawn either intermittently or continuously through pipe 20 and discharged from the system, or may be passed through pipe 21 to catalyst purifier 22. In catalyst purifier 22 the impurities may be removed as by distilling a substantially pure fraction comprising hydrogen fluoride and boron trifluoride from heavier impurities. The purified catalyst may be returned to the system through pipe 23 and the impurities may be discharged through pipe 24.

From separator 15 a hydrocarbon phase may be passed through pipe 25 to separating means 26 where it is fractionated to recover desired product fractions, recycle fractions and the like. Suitable product fractions such as isopentane may be withdrawn from the system through pipe 27 and/or pipe 28. Any light gases which are undesired may be discharged through pipe 30. A low-boiling fraction, comprising primarily hydrogen fluoride and boron trifluoride dissolved in the hydrocarbon phase passed through pipe 25, may be separated and returned to the system through pipe 31. A suitable recycle stream comprising unreacted paraffins such as unreacted normal pentane can be separated and returned through pipe 32. The stream passing through pipe 32 may also comprise a cycloparaffin which is suitable for use as the reaction modifier. In some instances, however, it may be found desirable to incorporate a part or all of the cycloparaffin in the effluents from the isomerization reactions as a part of the product removed through pipe 27, or 28. A cycloparaffin in this stream will have the same number of carbon atoms per molecule as the cycloparaffin initially charged through pipe 13.

Although at present my invention is applied primarily to the conversion of normal or moderately branched hydrocarbons to more highly branched hydrocarbons it will be understood that isomerization may also take place in the reverse direction if such is desirable, as when isopentane is converted to normal pentane, and that my invention applies equally well to this isomerization.

Example I

A steel vessel of 365 cc. volume with blades of a stirrer revolving inside stationary blades at 1750 R. P. M. to provide mixing was charged with n-hexane, methyl cyclopentane, HF and $BF_3$ in the order given and the materials were reacted under the conditions and with the results shown below.

| Run No. | I | | II | | III | | IV | |
|---|---|---|---|---|---|---|---|---|
| | Gm. | Wt. per cent | Gm. | Wt. per cent | Gm. | Wt. per cent | Gm. | Wt. per cent |
| n-Hexane | 82 | 100 | 65.7 | 78.2 | 68.7 | 89.2 | 68.8 | 91.7 |
| Methyl cyclopentane | 0 | 0 | 18.3 | 21.8 | 8.3 | 10.8 | 6.2 | 8.3 |
| HF | 131 | 98.0 | 116 | 97.1 | 116 | 96.9 | 117 | 96.9 |
| $BF_3$ | 2.7 | 2.0 | 3.5 | 2.9 | 3.7 | 3.1 | 3.7 | 3.1 |
| Time, min. | 30 | | 33 | | 60 | | 60 | |
| Temperature, °F. | 178 | | 194 | | 176 | | 176 | |

COMPOSITION OF EFFLUENT HYDROCARBON, PER CENT BY WEIGHT

| | | | | |
|---|---|---|---|---|
| Propane | 2.54 | 97% Boiling from 149 to 176° F. | | |
| Isobutane | 25.16 | | 0.70 | 2.30 |
| n-Butane | 5.23 | | | |
| Isopentane | 18.37 | | 1.64 | 1.20 |
| n-Pentane | 3.69 | | | |
| Neohexane | 13.26 | | 5.63 | 14.67 |
| Diisopropyl | 1.40 | | 1.18 | 4.81 |
| 2 and 3 methylpentane | 8.63 | | 45.43 | 48.35 |
| n-Hexane | 11.20 | | 38.04 | 19.91 |
| Methyl cyclopentane | 6.30 | | | 1.32 |
| Cyclohexane | 4.22 | | 7.38 | 7.44 |
| Heavier | | | | |
| | 100.00 | | 100.00 | 100.00 |

Example II

In a second series of runs 2-methylpentane was used as the paraffin charge stock, with methyl cyclopentane as the modifying hydrocarbon.

| Run No. | V | | VI | | VII | | VIII | |
|---|---|---|---|---|---|---|---|---|
| | Gm. | Wt. per cent | Gm. | Wt. per cent | Gm. | Wt. per cent | Gm. | Wt. per cent |
| 2-Methylpentane | 65 | 100 | 65 | 84.4 | 65 | 93.5 | 65 | 96.6 |
| Methylcyclopentane | 0 | 0 | 12 | 15.6 | 4.5 | 6.5 | 2.3 | 3.4 |
| HF | 127 | 94.1 | 124 | 97.9 | 116 | 97.9 | 116 | 97.9 |
| $BF_3$ | 8.0 | 5.9 | 2.7 | 2.1 | 2.5 | 2.1 | 2.5 | 2.1 |
| Time, min. | 18 | | 40 | | 40 | | 25 | |
| Temperature, °F. | 129 | | 160 | | 160 | | 160 | |

COMPOSITION OF EFFLUENT HYDROCARBON, PER CENT BY WEIGHT

| | | | | |
|---|---|---|---|---|
| Propane | 1.48 | | | 0.77 |
| Isobutane | 29.65 | 0.53 | | 15.17 |
| n-Butane | 4.94 | | | 1.19 |
| Isopentane | 19.40 | 0.53 | 1.18 | 16.73 |
| n-Pentane | 2.37 | | | 1.44 |
| Neohexane | 8.74 | 5.32 | 5.82 | 13.65 |
| Diisopropyl | 1.71 | 17.82 | 14.74 | 1.00 |
| 2 and 3 methylpentane | 10.13 | 54.65 | 62.34 | 18.88 |
| n-Hexane | 2.74 | 4.86 | | 10.91 |
| Methylcyclopentane | | | | |
| Cyclohexane | | 16.29 | 15.92 | 11.27 |
| Isoheptane | 6.92 | | | 8.99 |
| n-Heptane and heavier | 11.92 | | | |
| | 100.00 | 100.00 | 100.00 | 100.00 |

My invention is further exemplified by various runs reported in the following examples. In each of these examples runs which comprise my invention are contrasted with conversion runs in which no cycloparaffin is used as a reaction modifier.

Example III

In a third series of runs methylcyclopentane, cyclohexane and n-butane were each separately added to n-pentane, and the normal pentane subjected to isomerization.

| Run No. | IX | | X | | XI | | XII | |
|---|---|---|---|---|---|---|---|---|
| | Gm. | Wt. percent | Gm. | Wt. percent | Gm. | Wt. percent | Gm. | Wt. percent |
| n-Pentane | 76 | 100 | 61 | 85.1 | 61 | 85 | 17.1 | 25.6 |
| Methylcyclopentane | 0 | 0 | 10.7 | 14.9 | 0 | 0 | 0 | 0 |
| Cyclohexane | 0 | 0 | 0 | 0 | 10.8 | 15 | 0 | 0 |
| n-Butane | 0 | 0 | 0 | 0 | 0 | 0 | 49.8 | 74.4 |
| HF | 116 | 98.0 | 133 | 96.9 | 116 | 96.5 | 117 | 95.0 |
| BF₃ | 2.4 | 2.0 | 4.3 | 3.1 | 4.2 | 3.5 | 6.2 | 5.0 |
| Time, min | 20 | | 30 | | 40 | | 60 | |
| Temperature, °F | 165 | | 169 | | 169 | | 196 | |

COMPOSITION OF EFFLUENT HYDROCARBON, PER CENT BY WEIGHT

| | | | | |
|---|---|---|---|---|
| Propane | 0.86 | | | |
| Isobutane | 31.60 | 0.37 | 2.24 | 5.51 |
| n-Butane | 5.64 | 0.42 | | 62.86 |
| Isopentane | 20.43 | 23.51 | 50.33 | 18.32 |
| n-Pentane | 11.80 | 60.00 | 31.86 | ¹ 13.31 |
| Neohexane | 4.56 | | | |
| Diisopropyl | 1.30 | | | |
| 2- and 3-methylpentane | 11.00 | | | |
| n-Hexane | | | 0.62 | |
| Methylcyclopentane | | 3.99 | 3.67 | |
| Cyclohexane | | 10.96 | 8.78 | |
| Heptanes and heavier | 12.81 | 0.75 | 2.50 | |
| | 100.00 | 100.00 | 100.00 | 100.00 |

¹ n-Pentane and heavier.

Example IV

In a fourth series of runs 1,2-dimethylcyclopentane was added to n-heptane.

| Run No. | XIII | | XIV | | XV | |
|---|---|---|---|---|---|---|
| | Gm. | Wt. per cent | Gm. | Wt. per cent | Gm. | Wt. per cent |
| n-Heptane | 81.8 | 100 | 82 | 96.8 | 68.4 | 81.4 |
| 1,2-dimethylcyclopentane | 0 | 0 | 2.7 | 3.2 | 15.6 | 18.6 |
| HF | 146 | 89.6 | 116 | 95.4 | 121 | 95.6 |
| BF₃ | 16.9 | 10.4 | 5.6 | 4.6 | 5.5 | 4.4 |
| Time, min | 8 | | 40 | | 40 | |
| Temperature, °F | 120 | | 122 | | 124 | |

COMPOSITION OF EFFLUENT HYDROCARBON, PER CENT BY WEIGHT

| | | | |
|---|---|---|---|
| Propane | 1.34 | 1.30 | 4.55 |
| Isobutane | 17.80 | 21.22 | 9.24 |
| n-Butane | 2.57 | 4.22 | 2.80 |
| Isopentane | 12.88 | 16.02 | 3.50 |
| n-Pentane | 1.38 | 1.68 | 5.32 |
| Neohexane | 2.16 | | |
| Diisopropyl | 1.43 | 6.59 | 7.68 |
| 2- and 3-methylpentane | 6.73 | 7.92 | |
| n-Hexane | 0.96 | 2.68 | |
| Isoheptane | 7.24 | 9.18 | 20.21 |
| n-Heptane | 33.60 | 23.23 | 29.16 |
| Octanes and heavier | 11.91 | 5.96 | ¹ 17.54 |
| | 100.00 | 100.00 | 100.00 |

¹ Cyclic.

From the above examples it is evident that methylcyclopentane, cyclohexane, and 1,2-dimethylcyclopentane act as inhibitors of reactions other than insomerization and that the amounts may be so adjusted that splitting reactions are minimized. It is also apparent that diisopropyl can be produced in higher yield with cycloparaffin present than in its absence and that the neohexane-diisopropyl sum can be increased by using cyclics. When n-pentane was the charging stock, the proportions of isopentane were increased when methylcyclopentane, cyclohexane and n-butane were modifying agents.

As used in certain of the claims appended hereto, the term "a cyclopentane" is intended to include both cyclopentane as such and alkyl derivatives thereof such as methylcyclopentane.

I claim:
1. A process for effecting the isomerization of a low-boiling normally liquid paraffin hydrocarbon with a minimum of conversion to paraffin hydrocarbons of lower and higher molecular weights, which comprises admixing with a low-boiling paraffin hydrocarbon having at least five carbon atoms per molecule a low-boiling cycloparaffin having at least five carbon atoms in the ring in an amount between about 5 and about 25 per cent by weight of the total hydrocarbons, subjecting the resulting admixture to reaction at a temperature between about 50 and about 300° F. in the presence of and intimately admixed with a liquid catalyst consisting of hydrofluoric acid and between about 0.1 and 10 per cent by weight of boron trifluoride, with a ratio of catalyst to hydrocarbon phases between about 0.1:1 and about 3:1, for a reaction time not exceeding about two hours to isomerize said low-boiling paraffin hydrocarbon, and recovering from effluents of said reaction a hydrocarbon fraction containing an isomeric paraffin so produced.

2. A process for converting normal pentane to an isopentane with a minimum of conversion to other paraffin hydrocarbons, which comprises admixing with normal pentane a low-boiling cycloparaffin having at least five carbon atoms in the ring in an amount between about 5 and about 25 per cent by weight of the total hydrocarbons, subjecting the resulting admixture to reaction at a temperature between about 50 and about 300° F. in the presence of and intimately admixed with a liquid catalyst consisting of hydrofluoric acid and between about 0.1 and 10 per cent by weight of boron trifluoride, with a ratio of catalyst to hydrocarbon phases between about 0.1:1 and about 3:1, for a reaction time not exceeding about two hours to isomerize said normal pentane, and recovering from effluents of said reaction a hydrocarbon fraction containing an isopentane so produced.

3. A process for converting normal hexane to an isohexane with a minimum of conversion to other paraffin hydrocarbons, which comprises admixing with normal hexane a low-boiling cycloparaffin having at least five carbon atoms in the ring in an amount between about 5 and about 25 per cent by weight of the total hydrocarbons, subjecting the resulting admixture to reaction at a temperature between about 50 and about 300° F. in the presence of and intimately admixed with a liquid catalyst consisting of hydrofluoric acid and between about 0.1 and 10 per cent by weight of boron trifluoride, with a ratio of catalyst to hydrocarbon phases between about 0.1:1 and about 3:1, for a reaction time not exceeding about two hours to isomerize said normal hexane, and recovering from effluents of said reaction a hydrocarbon fraction containing an isohexane so produced.

4. A process for converting normal heptane to an isoheptane with a minimum of conversion to other paraffin hydrocarbons, which comprises admixing with normal heptane a low-boiling cycloparaffin having at least five carbon atoms in the ring in an amount between about 5 and about 25 per cent by weight of the total hydrocarbons, subjecting the resulting admixture to reaction at a temperature between about 50 and about 300° F. in the presence of and intimately admixed with a liquid catalyst consisting of hydrofluoric acid and between about 0.1 and 10 per cent by weight of boron trifluoride, with a ratio of catalyst to hydrocarbon phases between about 0.1:1 and about 3:1, for a reaction time not exceeding about two hours to isomerize said normal heptane, and recovering from effluents of said reaction a hydrocarbon fraction containing an isoheptane so produced.

5. A process for effecting the isomerization of a low-boiling paraffin hydrocarbon with a minimum of conversion to paraffin hydrocarbons having lower and higher molecular weights, which comprises admixing with a low-boiling isomerizable paraffin hydrocarbon a low-boiling cycloparaffin having at least five carbon atoms in the ring in an amount of at least 5 per cent and not greater than about 25 per cent by weight of the total hydrocarbons, subjecting the resulting admixture to reaction conditions such as to isomerize a substantial proportion of said paraffin hydrocarbon in the presence of an intimately admixed with an isomerization catalyst consisting of hydrofluoric acid and between about 0.1 and 10 per cent by weight of boron trifluoride, said reaction conditions including a temperature and pressure such that said hydrocarbon admixture and said catalyst are present as separate liquid phases, with a ratio of catalyst to hydrocarbon phases between about 0.1:1 and about 3:1, and recovering from effluents of said reaction a hydrocarbon fraction comprising an isomeric paraffin so produced.

6. The process of claim 2 in which said low-boiling cycloparaffin is a cyclopentane.

7. The process of claim 3 in which said low-boiling cycloparaffin is methylcyclopentane.

8. The process of claim 4 in which said low-boiling cycloparaffin is methylcyclohexane.

9. A process for effecting the isomerization of a low-boiling paraffin hydrocarbon with a minimum of conversion to paraffin hydrocarbons having lower and higher molecular weights, which comprises admixing with a low-boiling isomerizable paraffin hydrocarbon a low-boiling cycloparaffin having at least five carbon atoms in the ring in an amount not greater than about 25 per cent by weight of the total hydrocarbons, subjecting the resulting admixture to reaction conditions such as to isomerize a substantial proportion of said paraffin hydrocarbon in the presence of and intimately admixed with an isomerization catalyst selected from the class consisting of a catalyst consisting of hydrofluoric acid and a catalyst consisting of hydrofluoric acid and between about 0.1 and 10 per cent by weight of boron trifluoride, with a ratio of catalyst to hydrocarbon phases between about 0.1:1 and about 3:1, and recovering from effluents of said reaction a hydrocarbon fraction comprising an isomeric paraffin so produced.

10. An improved process for isomerizing a paraffin hydrocarbon having at least five carbon atoms per molecule, which comprises admixing with said paraffin hydrocarbon a minor amount of a normally liquid cycloparaffin hydrocarbon, subjecting the resulting admixture to reaction under isomerization conditions in the presence of a liquid catalyst consisting of hydrofluoric acid and boron trifluoride, the boron trifluoride being present in the catalyst in minor amount, and recovering from effluents of said reaction a hydrocarbon fraction containing an isomer of said paraffin hydrocarbon so produced.

11. The process of claim 9 wherein said isomerization catalyst consists of liquid hydrofluoric acid.

JOHN L. RICHMOND.

REFERENCES CITED

The following references are of record in the file of this patent:

UNITED STATES PATENTS

| Number | Name | Date |
| --- | --- | --- |
| 2,266,012 | d'Ouville et al. | Dec. 16, 1941 |
| 2,325,122 | Ipatieff et al. | July 27, 1943 |
| 2,335,406 | Goldsby et al. | Nov. 30, 1943 |
| 2,337,419 | Sensel | Dec. 21, 1943 |
| 2,339,849 | Goldsby et al. | Jan. 25, 1944 |
| 2,344,889 | Lynch et al. | Mar. 21, 1944 |
| 2,350,834 | Sensel et al. | June 6, 1944 |
| 2,354,565 | Wood III et al. | July 25, 1944 |
| 2,355,198 | Atwell | Aug. 8, 1944 |
| 2,370,118 | Axe | Feb. 27, 1945 |
| 2,376,078 | Oberfell et al. | May 15, 1945 |
| 2,382,815 | Sutton et al. | Aug. 14, 1945 |
| 2,403,649 | Frey | July 9, 1946 |
| 2,408,752 | Burk (A) | Oct. 8, 1946 |
| 2,408,753 | Burk (B) | Oct. 8, 1946 |

FOREIGN PATENTS

| Number | Country | Date |
| --- | --- | --- |
| 24,044 | India | Aug. 23, 1937 |
| 52,359 | Netherlands | Mar. 17, 1942 |